(12) United States Patent
Choi et al.

(10) Patent No.: US 9,156,346 B2
(45) Date of Patent: Oct. 13, 2015

(54) TRANSMISSION SYSTEM OF FOUR WHEEL DRIVE HYBRID ELECTRIC VEHICLE

(71) Applicant: Hyundai Motor Company, Seoul (KR)

(72) Inventors: Kum Lim Choi, Whasung-Si (KR); Kyoung Joo Kim, Whasung-Si (KR); Jinkuk Cho, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 3 days.

(21) Appl. No.: 14/138,947

(22) Filed: Dec. 23, 2013

(65) Prior Publication Data

US 2015/0099606 A1    Apr. 9, 2015

(30) Foreign Application Priority Data

Oct. 7, 2013    (KR) .................. 10-2013-0119315

(51) Int. Cl.
| | |
|---|---|
| *B60K 6/52* | (2007.10) |
| *B60W 20/00* | (2006.01) |
| *B60K 6/387* | (2007.10) |
| *B60K 6/44* | (2007.10) |
| *B60K 6/445* | (2007.10) |
| *B60K 6/38* | (2007.10) |

(52) U.S. Cl.
CPC . *B60K 6/52* (2013.01); *B60K 6/387* (2013.01); *B60K 6/44* (2013.01); *B60K 6/445* (2013.01); *B60W 20/10* (2013.01); *B60K 2006/381* (2013.01)

(58) Field of Classification Search
CPC ..... F16H 3/72; F16H 3/725; F16H 2003/447; F16H 37/04; F16H 2200/2005; F16H 2200/2038; B60W 20/10; B60K 6/52; B60K 6/445; B60K 6/54
See application file for complete search history.

(56) References Cited

U.S. PATENT DOCUMENTS

| | | | |
|---|---|---|---|
| 2005/0151420 A1* | 7/2005 | Crombez et al. .............. | 303/152 |
| 2006/0011395 A1* | 1/2006 | Sugiyama et al. ........... | 180/65.4 |
| 2008/0302590 A1* | 12/2008 | Sato .............................. | 180/242 |
| 2013/0253744 A1* | 9/2013 | Nishimine et al. .............. | 701/22 |

FOREIGN PATENT DOCUMENTS

| | | |
|---|---|---|
| JP | 11-208304 A | 8/1999 |
| JP | 11-332021 A | 11/1999 |
| JP | 2011-98663 A | 5/2011 |

* cited by examiner

*Primary Examiner* — Huan Le
(74) *Attorney, Agent, or Firm* — Morgan, Lewis & Bockius LLP

(57) ABSTRACT

A transmission system for a four wheel drive hybrid electric vehicle includes: an input shaft selectively connected to a front wheel transmission housing while being connected to an output shaft of an engine; a first motor/generator having disposed in the front wheel transmission housing; a second motor/generator having a function of the motor and the generator and connected to a rear wheel output gear disposed in a rear wheel transmission housing; a planetary gear set on the input shaft and including three rotating elements, in which among three rotating elements, a first rotating element is directly connected to the first motor/generator and selectively connected to the input shaft, a second rotating element is directly connected to the input shaft, and a third rotating element is selectively connected to a front wheel output gear; and a connection unit disposed at a selective connection part.

32 Claims, 8 Drawing Sheets

FIG. 2

| Driving mode | CL1 | CL2 | BK |
|---|---|---|---|
| EV mode | | | |
| Starting of engine | | ● | |
| Continuous mode | | ● | |
| Power split mode | ● | | |
| Parallel mode | ● | ● | |
| Regenerative braking mode | ● | | ● |

TRANSMISSION SYSTEM OF FOUR WHEEL DRIVE HYBRID ELECTRIC VEHICLE

CROSS-REFERENCE TO RELATED APPLICATION

The present application claims priority of Korean Patent Application Number 10-2013-0119315 filed Oct. 7, 2013, the entire contents of which application is incorporated herein for all purposes by this reference.

BACKGROUND OF INVENTION

1. Field of Invention

The present invention relates to a transmission system for a four wheel drive hybrid electric vehicle, and more particularly, to a transmission system for a four wheel drive hybrid electric vehicle capable of maximizing improvement of fuel efficiency by performing driving of a power split mode having better low-speed driving efficiency and a parallel mode having better high-speed driving efficiency.

2. Description of Related Art

Generally, a hybrid electric vehicle is a vehicle which is driven by effectively combining at least two different kinds of power sources.

The hybrid electric vehicle generally uses an engine and a motor/generator, and uses the motor/generator having a relatively better low-speed torque characteristic as a main power source in a low speed and uses the engine having a relatively better high-speed torque characteristic as the main power source in a high speed.

Therefore, since the hybrid electric vehicle stops an operation of the engine using fossil fuel and uses the motor/generator in a low-speed section, the hybrid electric vehicle has an excellent effect in improvement of fuel efficiency and reduction of exhaust gas.

Further, a transmission system for the hybrid electric vehicle as described above is classified into a single mode type and a multi mode type.

The single mode type may not require connection units, such as a clutch and a brake for transmission control, but may have the reduced fuel efficiency at the time of high-speed driving and require an additional torque multiplication apparatus so as to apply to a large vehicle.

The multi mode type may have increased efficiency at the time of high-speed driving and may be designed to enable torque multiplication, thereby being applied to a medium-large size vehicle.

Recently, the multi mode type is mainly used rather than using the single mode type. Therefore, a research for the multi mode type has been actively conducted.

The transmission system in the multi mode type is configured to include a planetary gear set, a plurality of motors/generators which are used as a motor and a generator, a connection unit which controls rotating elements of the planetary gear set, a battery which is used as a power source for the motor/generator, and the like.

The transmission system in the multi mode type has different operation mechanisms depending on a connection configuration of the planetary gear set, the motor/generator, and the connection unit.

Further, since the transmission system in the multi mode type has characteristics of which durability, power transmission efficiency, a size, and the like vary depending on the connection configuration, a research and development for implementing a power transmission mechanism which is more robust, reduces power loss, and is compact in a field of the transmission system for a hybrid electric vehicle has continued.

The hybrid electric vehicle may be classified into a two wheel drive (hereinafter, referred to as 2WD) type and a four wheel drive (hereinafter, referred to as 4WD) type depending on a driving type.

The 2WD hybrid electric vehicle is generally configured to drive a front wheel using two motors/generators and a planetary gear set.

The 4WD hybrid electric vehicle is configured to drive the front wheel using the two motors/generators and the planetary gear set and is configured to drive a rear wheel using one motor/generator.

However, the 4WD hybrid electric vehicle according to various embodiments of the present invention uses the two motors/generators and the planetary gear set to drive the front wheel to convert a part of the power of the engine into electrical energy at all times, such that fuel efficiency may be reduced in a high-speed region.

Therefore, in order to supplement the above problem, there is a need to increase the number of planetary gear sets and the number of clutches and brakes, which may lead to reduced power transmission efficiency and increased production cost.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a transmission system for a four wheel drive hybrid electric vehicle capable of saving production cost by using motor/generators less by one than in the related art.

Further, various aspects of the present invention provide for a transmission system for a four wheel drive hybrid electric vehicle capable of maximizing improvement of fuel efficiency by performing driving of a power split mode having better low-speed driving efficiency and a parallel mode having better high-speed driving efficiency.

Further, various aspects of the present invention have been made in an effort to provide a transmission system for a four wheel drive hybrid electric vehicle capable of saving production cost by reducing a capacity of a motor/generator for generation using a power split mode.

Various aspects of the present invention provide for a transmission system for a four wheel drive hybrid electric vehicle, including: an input shaft selectively connected to a front wheel transmission housing while being connected to an output shaft of an engine; a first motor/generator having a function of a motor and a generator and disposed in the front wheel transmission housing; a second motor/generator having a function of the motor and the generator and connected to a rear wheel output gear to be disposed in a rear wheel transmission housing; a planetary gear set disposed on the input shaft and including three rotating elements, in which among three rotating elements, a first rotating element is directly connected to the first motor/generator and selectively connected to the input shaft, a second rotating element is directly connected to the input shaft, and a third rotating element is selectively connected to a front wheel output gear; and a connection unit disposed at a selective connection part.

The transmission system for a four wheel drive hybrid electric vehicle may further include: a front wheel reduction gear unit disposed on a front wheel midshaft disposed in parallel with the input shaft to reduce and transmit rotating power transmitted from the front wheel output gear to a front wheel differential; and a rear wheel reduction gear unit reducing and transmitting rotating power transmitted from the rear wheel output gear of the second motor/generator to a rear wheel differential.

The front wheel reduction gear unit may include: a front wheel midshaft disposed in parallel with the input shaft between the input shaft and the front wheel differential; a front wheel first mid gear disposed on the front wheel midshaft to be externally gear connected to the front wheel output gear; and a front wheel second mid gear disposed on the front wheel midshaft to be externally gear connected to the front wheel final reduction gear of the front wheel differential.

The rear wheel reduction gear unit may include: a rear wheel midshaft disposed between the rear wheel output gear and the rear wheel differential; and a rear wheel mid gear disposed on the rear wheel midshaft to be internally and externally gear connected between the rear wheel output gear and the rear wheel final reduction gear of the rear wheel differential, respectively.

The planetary gear set may be a single pinion planetary gear set and include a sun gear as the first rotating element, a planetary carrier as the second rotating element, and a ring gear as the third rotating element.

The connection unit may include: a first clutch disposed between a third rotating element of the planetary gear set and the front wheel output gear; a second clutch disposed between the first rotating element of the planetary gear set and the input shaft; and a brake disposed between the input shaft and the front wheel transmission housing.

The connection unit may release all the operations of the first and second clutches and the brake in the EV mode, operate only the second clutch in the starting of the engine and a continuous mode, operate the first and second clutches in the parallel mode, and operate only the first clutch in the power split mode, and operate the first clutch and the brake in a regenerative braking mode.

A torsion damper may be disposed between the output shaft and the input shaft of the engine.

The first motor/generator may be a generation purpose and the second motor/generator may be a driving purpose.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each driving mode of a connection unit which is applied to an exemplary transmission system for a four wheel drive hybrid electric vehicle according to the present invention.

DETAILED DESCRIPTION

Figure 1:
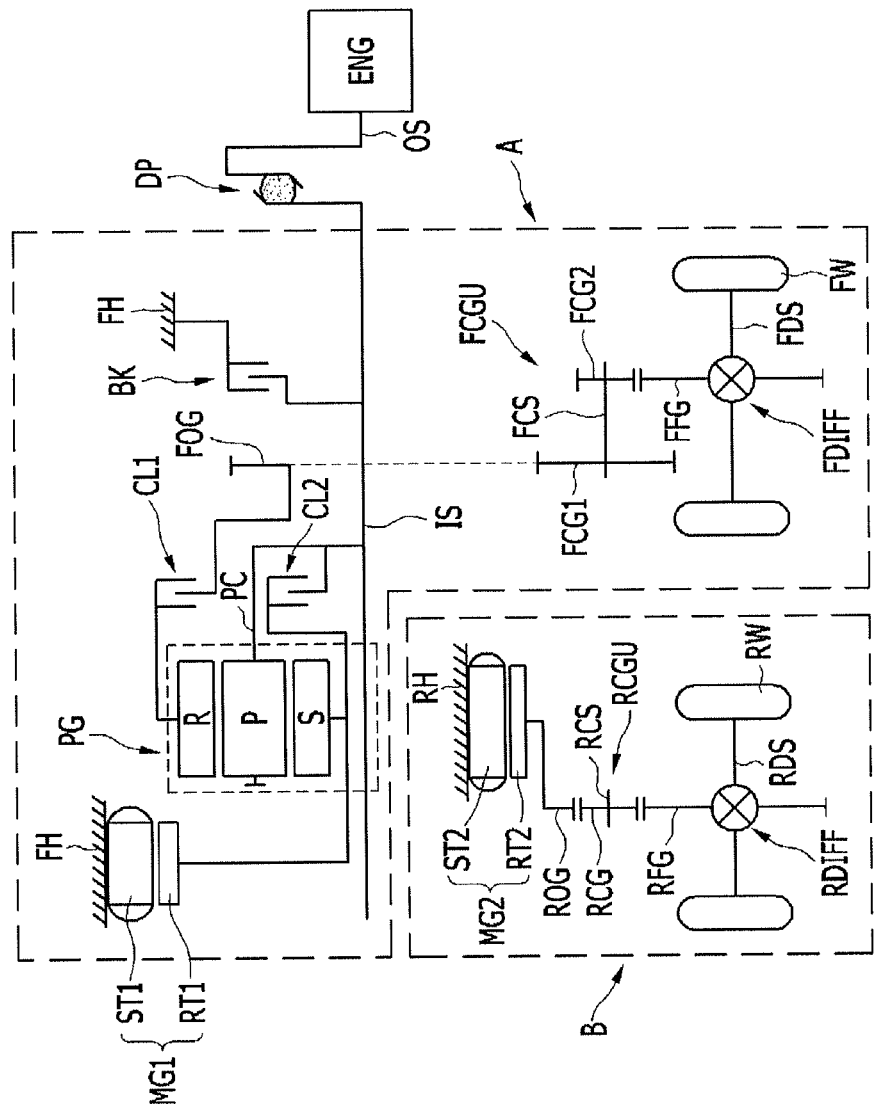
FIG. 1 is a configuration diagram of an exemplary transmission system for a four wheel drive hybrid electric vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive. Like reference numerals designate like elements throughout the specification.

In the following description, the same components are classified into first, second, and the like to differentiate names for components and a sequence thereof is not necessarily limited thereto.

FIG. 1 is a configuration diagram of a transmission system for a four wheel drive hybrid electric vehicle according to various embodiments of the present invention.

Referring to FIG. 1, a transmission system for a four wheel drive hybrid electric vehicle according to various embodiments of the present invention is described by being divided into a front wheel driving unit A and a rear wheel driving part B.

The front wheel driving part A includes an input shaft IS, a planetary gear set PG, a first motor/generator MG1, connection units CL1, CL2, and BK, and a front wheel reduction gear unit FCGU.

The input shaft IS is disposed to receive a driving torque of the engine ENG which is the power source and a torsion damper DP is disposed between an output shaft OS and the input shaft IS of the engine ENG.

The torsion damper DP attenuates or reduces torsional vibration which occurs between the output shaft OS and the input shaft IS of the engine ENG.

The torsion damper DP may be formed of rubber, torsional spring, or the like which may absorb a torsional impact, but is not limited to any one component, and therefore any torsion damper DP which may absorb the torsional vibration occurring between the output shaft OS and the input shaft IS of the engine ENG may be used.

The planetary gear set PG, which is a single pinion planetary gear set, includes, as rotating elements, a sun gear S (first rotating element), a planetary carrier PC (second rotating element) which rotatably supports a pinion P externally engaged with the sun gear S, and a ring gear R (third rotating element) internally engaged with the pinion P.

The sun gear S (first rotating element) is selectively connected to the input shaft S or the planetary carrier PC (second rotating element), the planetary carrier PC (second rotating element) is directly connected to the input shaft IS, and the ring gear R (third rotating element) is selectively connected to a front wheel output gear FOG.

The first motor/generator MG1, which is an independent power source, has a function of the motor and generator and in various embodiments of the present invention, is mainly operated as a generator and as a motor at the time of starting the engine.

Further, the first motor/generator MG1 is configured to include a first rotor RT1 and a first stator ST1, in which the first rotor RT1 is directly connected to the sun gear S (first rotating element) of the planetary gear set PG and the first stator ST1 is directly fixed to a front wheel transmission housing FH.

The connection unit is configured to include the first and second clutches CL1 and CL2 and the brake BK.

The first clutch CL1 is disposed between the ring gear R (third rotating element) of the planetary gear set PG and the front output gear FOG, the second clutch CL2 is disposed between the sun gear S (first rotating element) of the planetary gear set PG and the input shaft IS or the planetary carrier PC (second rotating element), and the brake BK is disposed between the input shaft IS and the front wheel transmission housing FH.

The first clutch CL1 selectively transmits the rotating power output from the ring gear R (third rotating element) of the planetary gear set PG to the front wheel output gear FOG or selectively transmits the rotating power transmitted from the front wheel output gear FOG to the ring gear R (third rotating element).

The second clutch CL2 serves as the lock-up unit so that the overall planetary gear set PG may be one rotating body.

The brake BK fixes the input shaft IS while being operated along with the first clutch CL1 in the regenerative braking mode and increases a regenerative braking force input through the front wheel reduction gear unit FCGU in the planetary gear set PG and transmits the increased regenerative braking force to the first motor/generator MG to perform the generation driving.

In the above description, the first and second clutches CL1 and CL2 and the brake BK may be configured as a multi-plate type hydraulic friction engaging unit which is friction engaged due to a hydraulic pressure, but various embodiments of the present invention is not limited thereto.

Further, the front wheel reduction gear unit FCGU is externally engaged with the front wheel output gear FOG by disposing an front wheel midshaft FCS between the input shaft IS and the front wheel differential DIFF to be parallel with the input shaft IS and disposing a front wheel first mid gear FCG1 at one side of the front wheel midshaft FCS.

Further, a front wheel second mid gear FCG2 is disposed on the other side of the front wheel midshaft FCS to be externally engaged with the front wheel final reduction gear FFG of the front wheel differential FDIFF.

In this case, the front wheel reduction gear unit FCGU reduces the rotating power of the front wheel output gear FOG by configuring the front wheel first mid gear FCG1 as a large diameter gear having a diameter larger than that of the front wheel second mid gear FCG2 and transmits the reduced rotating power to the front wheel final reduction gear FFG.

As known, the front wheel differential FDIFF uses or differentiates rotating power reduced and input depending on a gear ratio of the front wheel second mid gear FCG2 and the front wheel final reduction gear FFG, depending on a road condition to transmit the rotating power to the front wheel FW through the front drive shaft FDS as it is or transmit the differentiated rotating power to the front wheel FW through the front wheel drive shaft FDS.

Meanwhile, the rear wheel drive part B includes a second motor/generator MG2 and a rear wheel reduction gear unit RCGU.

The second motor/generator MG2, which is an independent power source, has the function of the motor and generator and in various embodiments of the present invention, is mainly used as a motor.

Further, the second motor/generator MG2 is configured to include a second rotor RT2 and a second stator ST2, in which the second rotor RT2 is directly connected to the rear wheel output gear ROG and the second stator ST2 is directly fixed to the transmission housing H.

Further, the second motor/generator MG2 is configured to include a second rotor RT2 and a second stator ST2, in which the second rotor RT2 is directly connected to the rear wheel output gear ROG and the second stator ST2 is directly fixed to the rear wheel transmission housing RH.

In the rear wheel reduction gear unit RCGU, a rear wheel midshaft RCS is disposed between the rear wheel output gear ROG and the rear wheel differential RDIFF and the rear wheel mid gear RCG internally and externally gear-connected between the rear wheel output gear ROG and a rear wheel final reduction gear RFG of the rear wheel differential RDIFF is disposed on the rear wheel midshaft RCS.

As known, the rear wheel differential RDIFF uses or differentiates the rotating power reduced and input depending on a gear ratio of the rear wheel mid gear RCG and the rear wheel final reduction gear RFG, depending on a road condition to transmit the rotating power to the rear wheel RW through the rear drive shaft FDS as it is or transmit the differentiated rotating power to the rear wheel FW through the rear wheel drive shaft FDS.

FIG. 2 is an operation table for each driving mode of a connection unit which is applied to the transmission system for a four wheel drive hybrid electric vehicle according to various embodiments of the present invention.

Referring to FIG. 2, the transmission system for a four wheel drive hybrid electric vehicle according to various embodiments of the present invention may implement the EV mode, the starting of the engine, the continuous mode, the power split mode, the lock-up driving of the parallel mode, and the regenerative braking mode.

That is, in the EV mode, all the operations of the first and second clutches CL1 and CL2 and the brake BK are released, in the starting of the engine and the continuous mode, only the second clutch CL2 is operated, in the power split mode, only the first clutch CL1 is operated, in the parallel mode, the first and second clutches CL1 and CL2 are operated, and in the regenerative braking mode, the first clutch CL1 and the brake BK are operated.

Here, the lock-up driving of the parallel mode makes the planetary gear set PG be set in the lock-up state depending on the operation of the second clutch CL2 to symbolically represent that a ratio of the input and the output of the planetary gear set PG is set to be 1:1. In terms of the overall transmission system, the meaning of the lock-up driving of the parallel mode includes an under drive UD, 1:1, and an over drive OD which are implemented depending on the gear ratio of the front wheel first mid gear FCG1 and the front wheel second mid gear FCG2 of the front wheel reduction gear unit FCGU engaged with the front wheel output gear FOG.

Hereinafter, the power transmission system for each driving mode of the transmission system for a four wheel drive hybrid electric vehicle according to various embodiments of the present invention will be described with reference to FIGS. 3 to 8.

Figure 3:
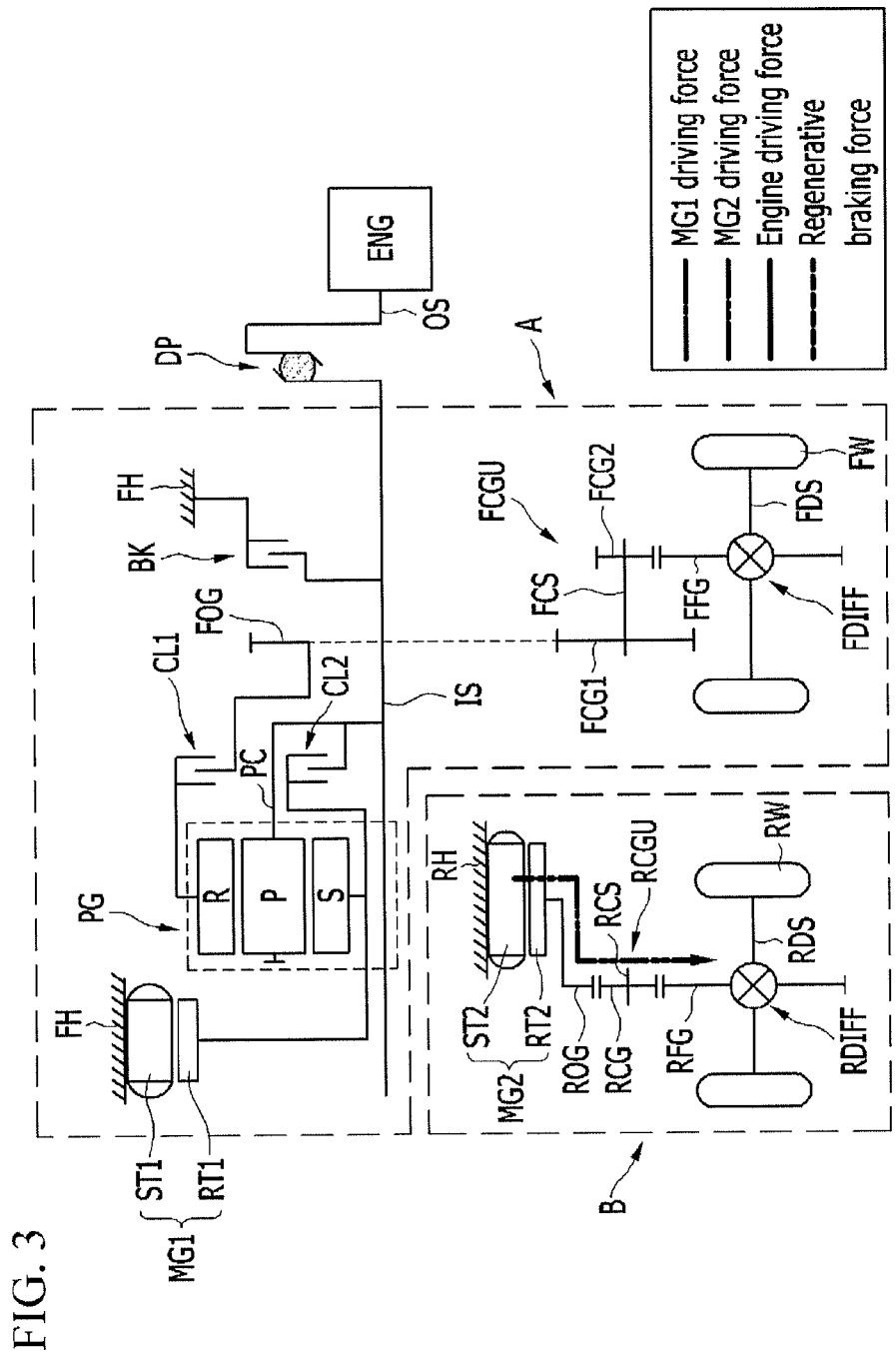
FIG. 3 is an exemplary power transmission system diagram in an EV mode of the transmission system for a four wheel drive hybrid electric vehicle according to the present invention.

FIG. 3 is a power transmission system diagram in the EV mode of the transmission system for a four wheel drive hybrid electric vehicle according to various embodiments of the present invention.

Referring to FIG. 3, in the EV mode, all of the first and second clutches CL1 and CL2 and the brake BK are configured not to be operated.

In the EV mode, the engine ENG keeps an operation stopping state and the output control of the second motor/generator MG2 is performed.

That is, the rotating power is transmitted to the rear wheel final reduction gear RFG of the rear wheel differential RDIFF through the rear wheel output gear ROG and the rear mid gear RCG by the driving of the second motor/generator MG2 and the rotating power of the second motor/generator MG2 transmitted to the rear wheel differential RDIFF through the rear wheel final reduction gear RFG is used as the input as it is or differentiated depending on a road condition to drive the rear wheel RW through the rear wheel drive shaft DS.

Figure 4:
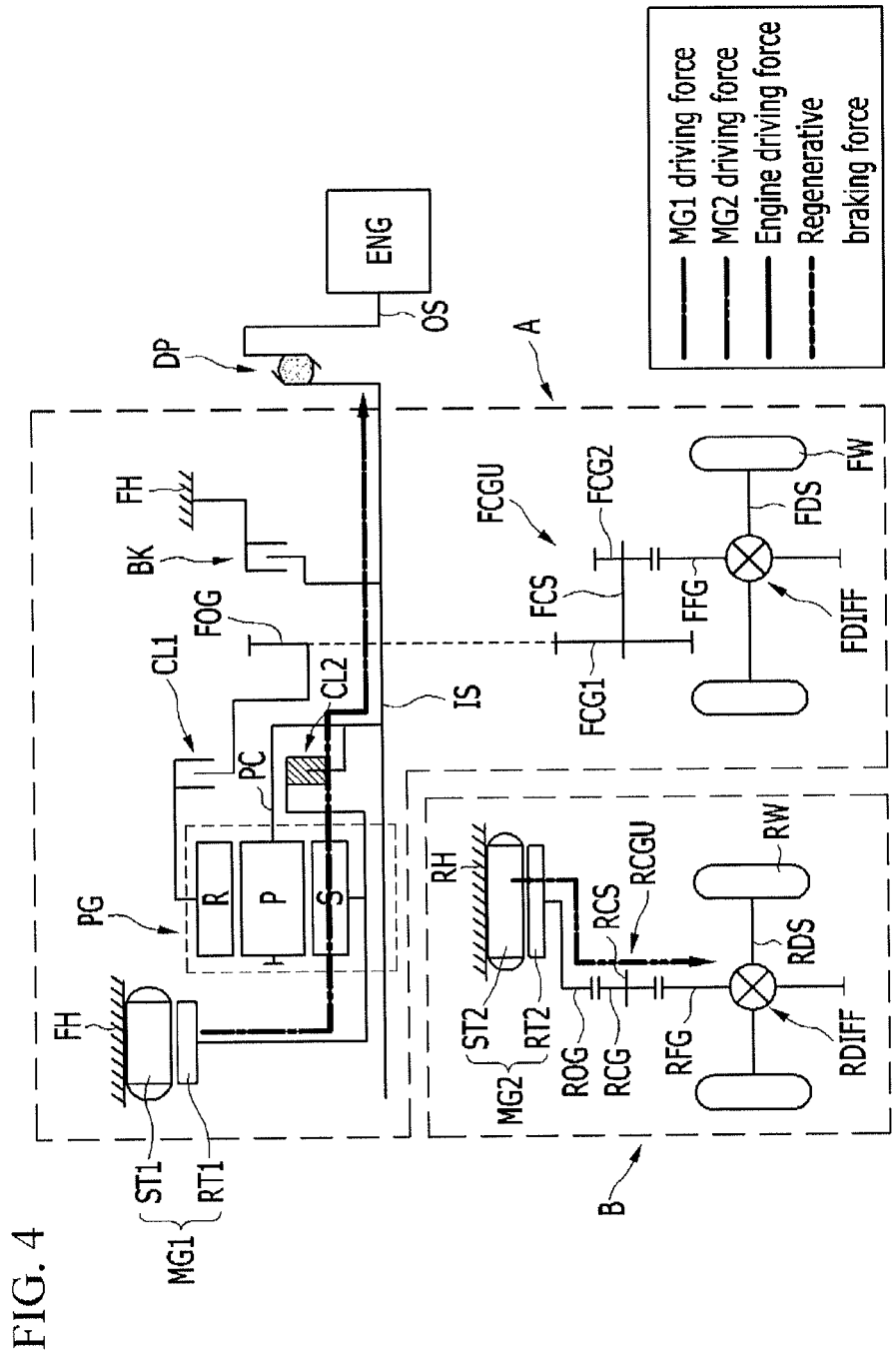
FIG. 4 is an exemplary power transmission system diagram in starting of an engine of the transmission system for a four wheel drive hybrid electric vehicle according to the present invention.

FIG. 4 is a power transmission system diagram in starting of an engine of the transmission system for a four wheel drive hybrid electric vehicle according to various embodiments of the present invention.

Referring to FIG. 4, when the speed of the vehicle is equal to or more than a set value in the EV mode state as described above, the engine ENG starts. In this case, the second clutch CL2 is controlled to be operated.

Next, the rotating power of the first motor/generator MG1 is transmitted to the engine ENG through the sun gear S of the planetary gear set PG, the second clutch CL2, and the input shaft IS while the first motor/generator MG1 is controlled to be operated, thereby performing the starting of the engine ENG.

Further, after the engine ENG starts, the operation of the second clutch CL2 is released. In this case, the planetary gear set PG is not directly involved with the starting of the engine.

Figure 5:
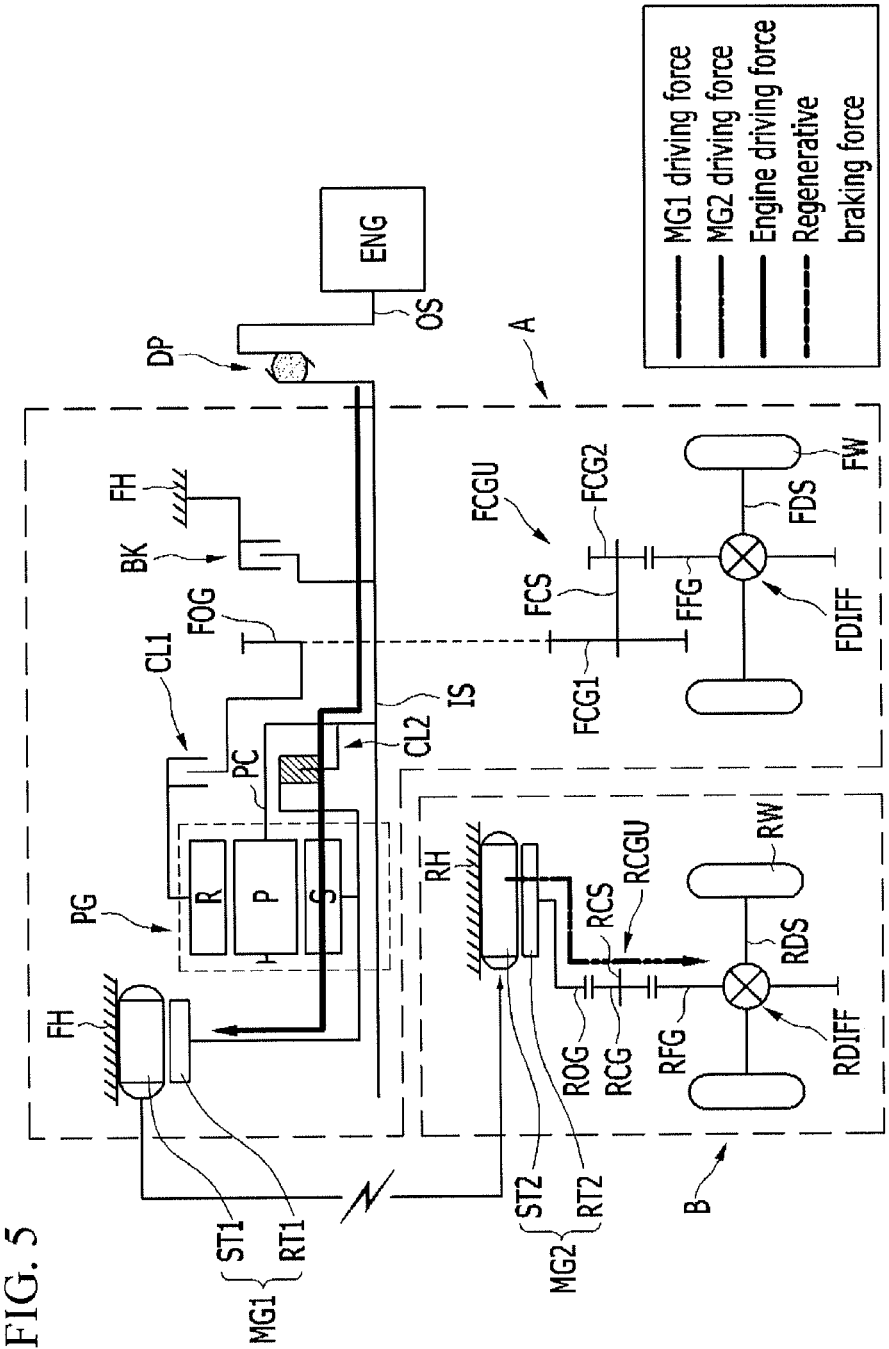
FIG. 5 is an exemplary power transmission system diagram in a continuous mode of the transmission system for a four wheel drive hybrid electric vehicle according to the present invention.

FIG. 5 is a power transmission system diagram in a continuous mode of the transmission system for a four wheel drive hybrid electric vehicle according to various embodiments of the present invention.

Referring to FIG. 5, in the state in which the engine ENG starts in the continuous mode, the second clutch CL2 is controlled to be operated.

Next, the rotating power of the engine ENG drives the first motor/generator MG1 through the input shaft IS, the second clutch CL2, and the sun gear S of the planetary gear set PG while the vehicle is driven in the EV mode, thereby performing the generation in the first motor/generator MG1 and the overall generation electricity generated from the first motor/generator MG1 is supplied to the second motor/generator MG2 as the driving power to drive the vehicle with a driving torque of the second motor/generator MG2.

Figure 6:
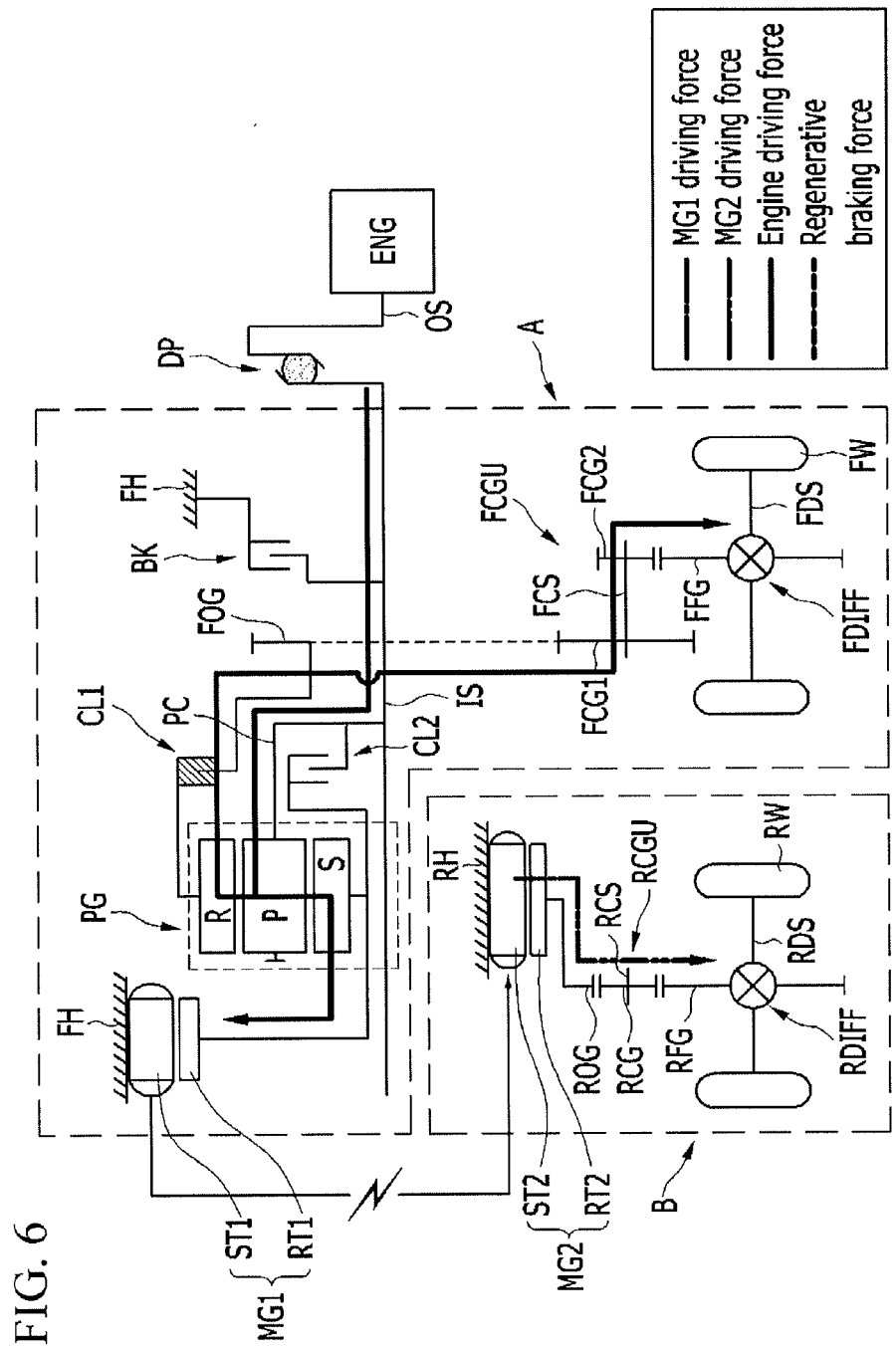
FIG. 6 is an exemplary power transmission system diagram in a power split mode of the transmission system for a four wheel drive hybrid electric vehicle according to the present invention.

FIG. 6 is a power transmission system diagram in a power split mode of the transmission system for a four wheel drive hybrid electric vehicle according to various embodiments of the present invention.

Referring to FIG. 6, in the power split mode, the first clutch CL1 is controlled to be operated.

In the power split mode, the rotating power of the engine ENG is applied as main power and the rotating power of the second motor/generator MG2 is applied as auxiliary power.

That is, the rotating power of the engine ENG is input to the planetary gear set PG through the input shaft IS and the planetary carrier PC and a portion of the rotating power input to the planetary gear set PG is transmitted to the first motor/generator MG1 through the sun gear S by a complementary operation of each rotating element of the planetary gear set PG and a portion thereof is transmitted to the front wheel output gear FOG through the first clutch CL1.

In this case, the rotating power of the engine ENG may be involved with the generation of the first motor/generator MG2 while a torque remains. That is, in the first motor/generator MG1, the generation is made by the rotating power of the engine ENG transmitted through the planetary gear set PG and the generated electricity is supplied to the second motor/generator MG2 as driving power and the remaining electricity is charged in a battery.

In the power split mode, an electronically variable speed is made by an output control of the second motor/generator MG2 transmitted to the rear wheel output gear ROG as the auxiliary power, along with the output of the engine ENG transmitted to the front wheel output gear FOG through the ring gear R as the main power.

That is, the rotating power of the engine ENG input to the front wheel output gear FOG is transmitted to the front wheel differential FDIFF through the front wheel reduction gear unit FCGU and the rotating power of the engine ENG transmitted to the front wheel differential FDIFF is used as the input as it is or differentiated depending on the road condition to drive the front wheel FW through the front wheel drive shaft FDS.

Further, the rotating power of the second motor/generator MG2 input to the rear wheel output gear ROG is transmitted to the rear wheel differential RDIFF through the rear wheel output gear ROG and the rear wheel mid gear RCG as the auxiliary power and is used as the input as it is or differentiated depending on the road condition to drive the rear wheel RW through the rear wheel drive shaft RDS.

Figure 7:
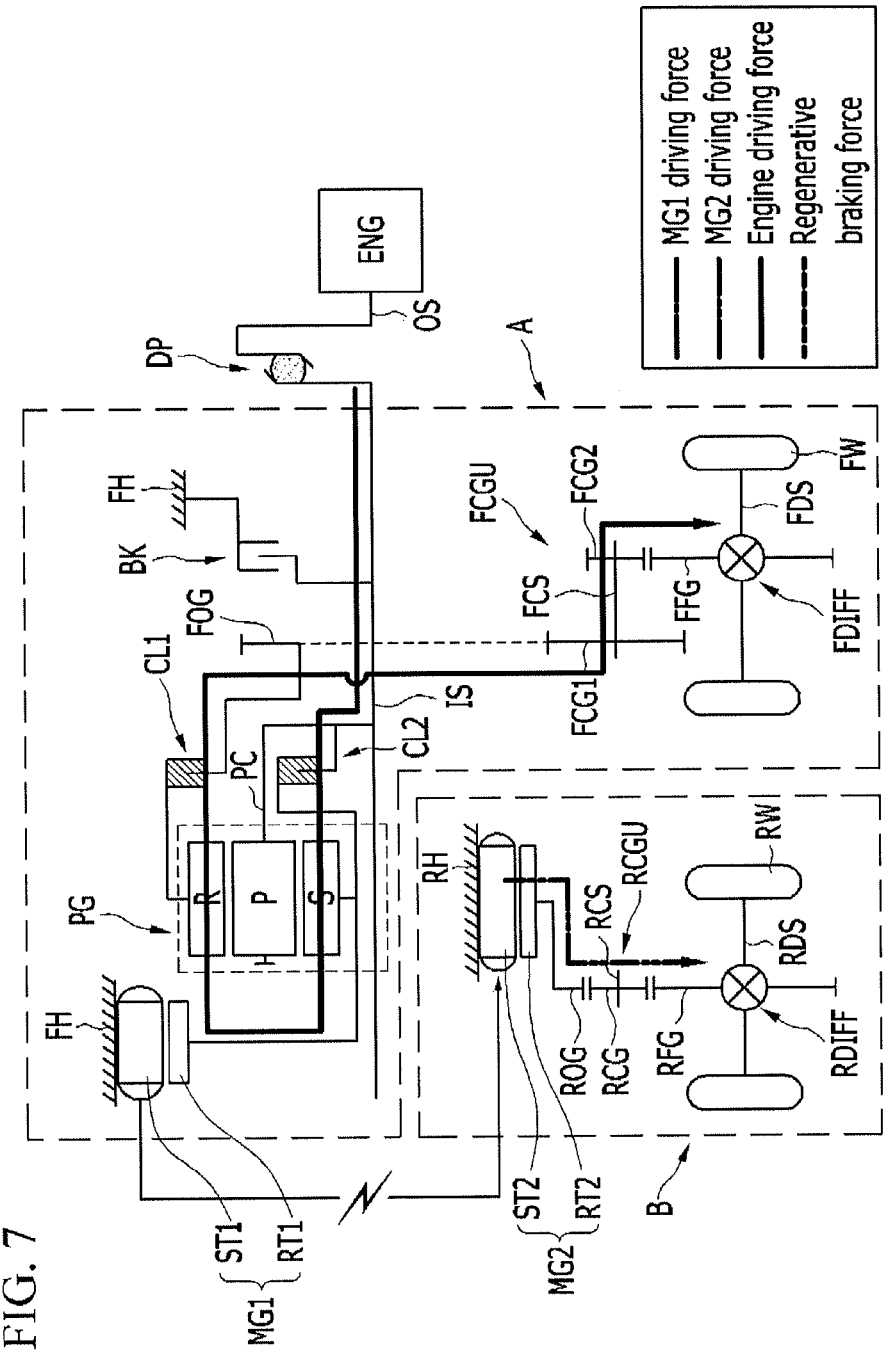
FIG. 7 is an exemplary power transmission system diagram in lock-up driving of a parallel mode of the transmission system for a four wheel drive hybrid electric vehicle according to the present invention.

FIG. 7 is a power transmission system diagram in lock-up driving of a parallel mode of the transmission system for a four wheel drive hybrid electric vehicle according to various embodiments of the present invention.

Referring to FIG. 7, in the parallel mode (that is, lock-up driving), the first and second clutches CL1 and CL2 are controlled to be operated.

In the parallel mode (the lock-up driving), the rotating power of the engine ENG is applied as main power and the rotating power of the second motor/generator MG2 is applied as auxiliary power.

That is, in the state in which the planetary gear set PG is locked-up by the operation of the second clutch CL2, the rotating power of the engine ENG is transmitted to the front wheel output gear FOG, which is power connected to the ring gear R of the planetary gear set PG, as the main power of the same speed by the operations of the input shaft IS, the planetary gear set PG, and the second clutch CL2, and at the same time, the rotating power of the second motor/generator MG2 is transmitted to the rear wheel output gear ROG as the auxiliary power.

In this case, a portion of the rotating power of the engine ENG is involved with the generation of the first motor/generator MG1. That is, in the first motor/generator MG1, the generation is made by the rotating power of the engine ENG transmitted through the locked-up planetary gear set PG and the generated electricity is supplied to the second motor/generator MG2 as driving power and the remaining electricity is charged in a battery.

In the parallel mode as described above, the output control of the second motor/generator MG2 transmitted to the rear wheel output gear ROG as the auxiliary power is made, along with the lock-up output of the engine ENG transmitted to the front wheel output gear FOG through the input shaft IS and the locked-up planetary gear set PG as the main power.

That is, the rotating power of the engine ENG input to the front wheel output gear FOG is transmitted to the front wheel differential FDIFF through the front wheel reduction gear unit FCGU and the rotating power of the engine ENG transmitted to the front wheel differential FDIFF is used as the input as it is or differentiated depending on the road condition to drive the front wheel FW through the front wheel drive shaft FDS.

Further, the rotating power of the second motor/generator MG2 input to the rear wheel output gear ROG is transmitted to the rear wheel differential RDIFF through the rear wheel output gear ROG and the rear wheel mid gear RCG as the auxiliary power and is used as the input as it is or differentiated depending on the road condition to drive the rear wheel RW through the rear wheel drive shaft RDS.

Figure 8:
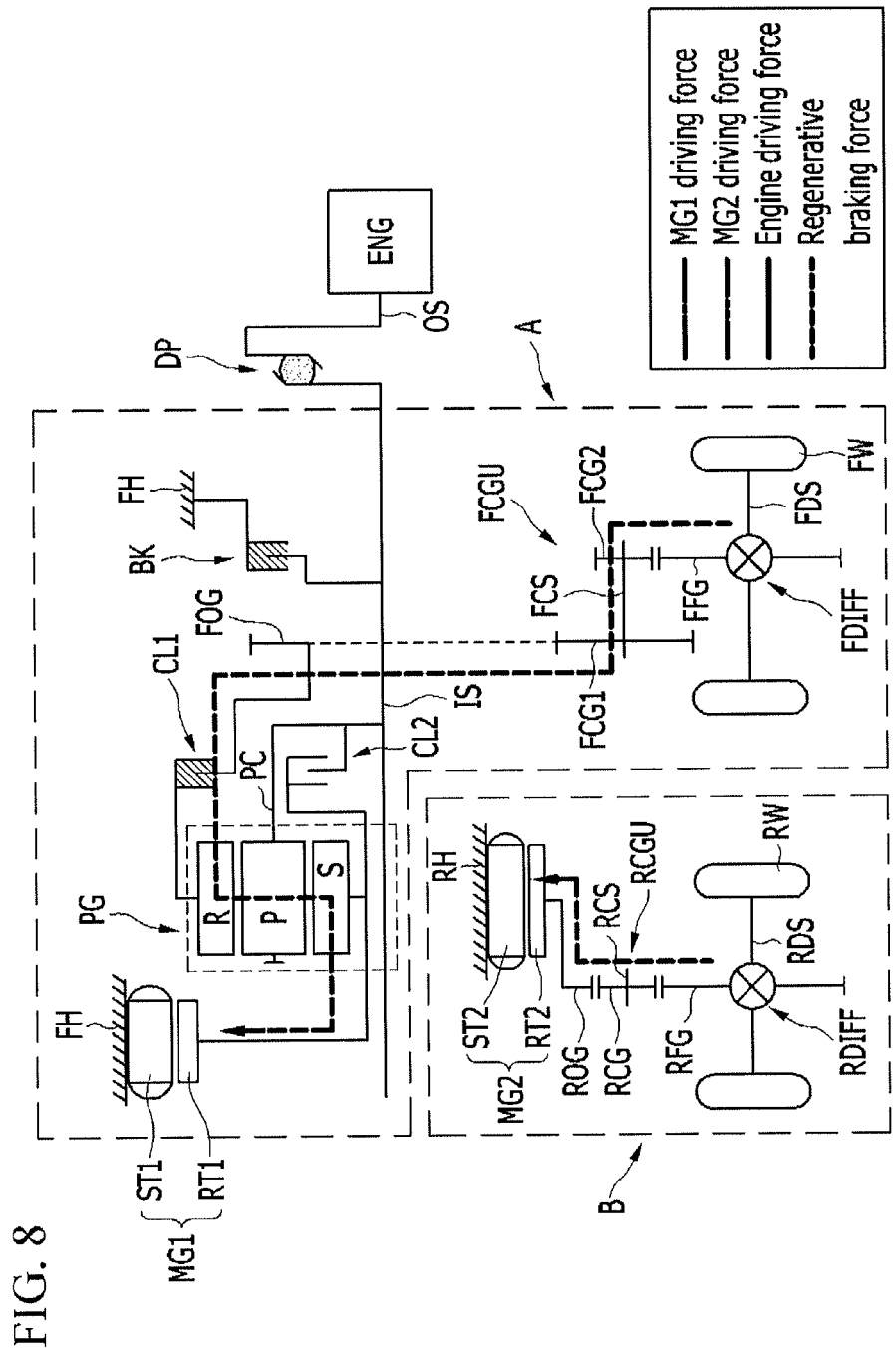
FIG. 8 is an exemplary power transmission system diagram in a regenerative braking mode of the transmission system for a four wheel drive hybrid electric vehicle according to the present invention.

FIG. 8 is a power transmission system diagram in a regenerative braking mode of the transmission system for a four wheel drive hybrid electric vehicle according to various embodiments of the present invention.

Referring to FIG. 8, in the regenerative braking mode, the first clutch CL1 and the brake BK are controlled to be operated.

The regenerative braking mode is operated at the time of coasting driving or braking of the vehicle and in the state in which the planetary carrier PC is operated as the fixed element by the operation of the brake BK, the regenerative braking force from the front wheel FW is input to the first motor/generator MG1 through the first clutch CL1 and the planetary gear set PG, thereby performing the generation driving of the first motor/generator MG1.

Further, the regenerative braking force from the rear wheel RW is directly input to the second motor/generator MG2 and thus the second motor/generator MG2 is operated as the generator to perform the generation driving.

That is, in the regenerative braking mode, both of the first and second motors/generators MG1 and MG2 are operated as the generator by the rotating power input from the front wheel FW and the rear wheel RW through an inverse path.

In this case, when the regenerative braking through the first motor/generator MG1 of the front wheel side is not implemented, the configuration of the brake BK may be excluded, such that the transmission system may be more simply configured.

The transmission system for a four wheel drive hybrid electric vehicle according to various embodiments of the present invention configured and operated as described above uses the motor/generators less by one than the transmission system according to the related art, thereby reducing the production cost.

Further, it is possible to maximize the improvement of fuel efficiency by performing the driving of the power split mode having the better low-speed driving efficiency and the parallel mode having the better high-speed driving efficiency and increase the driving point freedom of the engine by various driving modes such as the EV mode, the power split mode, the parallel mode, and the continuous mode which may be implemented.

Further, it is possible to reduce the capacity of the motor/generator for generation by implementing the power split mode, thereby saving the production cost.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system for a four wheel drive hybrid electric vehicle, comprising:
   an input shaft selectively connected to a front wheel transmission housing while being connected to an output shaft of an engine;
   a first motor/generator having motor and generator functions and disposed in the front wheel transmission housing;
   a second motor/generator having motor and generator functions and connected to a rear wheel output gear disposed in a rear wheel transmission housing;
   a planetary gear set on the input shaft and including three rotating elements, in which among three rotating elements, a first rotating element is directly connected to the first motor/generator and selectively connected to the input shaft, a second rotating element is directly connected to the input shaft, and a third rotating element is selectively connected to a front wheel output gear; and
   a connection unit disposed at a selective connection part.

2. The transmission system for the four wheel drive hybrid electric vehicle of claim 1, further comprising:
   a front wheel reduction gear unit on a front wheel midshaft parallel with the input shaft to reduce and transmit rotating power transmitted from the front wheel output gear to a front wheel differential; and
   a rear wheel reduction gear unit reducing and transmitting rotating power transmitted from the rear wheel output gear of the second motor/generator to a rear wheel differential.

3. The transmission system for the four wheel drive hybrid electric vehicle of claim 2, wherein the planetary gear set is a single pinion planetary gear set and includes a sun gear as the first rotating element, a planetary carrier as the second rotating element, and a ring gear as the third rotating element.

4. The transmission system for the four wheel drive hybrid electric vehicle of claim 2, wherein a torsion damper is between the output shaft and the input shaft of the engine.

5. The transmission system for the four wheel drive hybrid electric vehicle of claim 2, wherein the first motor/generator is a generation purpose and the second motor/generator is a driving purpose.

6. The transmission system for the four wheel drive hybrid electric vehicle of claim 2, wherein the front wheel reduction gear unit includes:

the front wheel midshaft parallel with the input shaft between the input shaft and the front wheel differential;

a first mid gear on the front wheel midshaft gear-meshed with the front wheel output gear; and a front wheel second mid gear on the front wheel midshaft gear-meshed with a front wheel final reduction gear of the front wheel differential.

7. The transmission system for the four wheel drive hybrid electric vehicle of claim 6, wherein the rear wheel reduction gear unit includes:

a rear wheel midshaft between the rear wheel output gear and the rear wheel differential; and a rear wheel mid gear on the rear wheel midshaft gear-meshed between the rear wheel output gear and the rear wheel final reduction gear of the rear wheel differential, respectively.

8. The transmission system for the four wheel drive hybrid electric vehicle of claim 2, wherein the connection unit includes:

a first clutch between the third rotating element of the planetary gear set and the front wheel output gear;

a second clutch between the first rotating element of the planetary gear set and the input shaft; and a brake between the input shaft and the front wheel transmission housing.

9. The transmission system for the four wheel drive hybrid electric vehicle of claim 8, wherein:

the connection unit releases all the operations of the first and second clutches and the brake in an EV mode;

operates only the second clutch in the starting of the engine and a continuous mode;

operates the first and second clutches in a parallel mode;

operates only the first clutch in a power split mode; and operates the first clutch and the brake in a regenerative braking mode.

10. A transmission system for a four wheel drive hybrid electric vehicle, comprising:

an input shaft selectively connected to a front wheel transmission housing while being connected an output shaft of an engine;

a first motor/generator having motor and generator functions and disposed in the front wheel transmission housing;

a second motor/generator having motor and generator functions and connected to a rear wheel output gear disposed in a rear wheel transmission housing;

a planetary gear set on the input shaft and including a sun gear directly connected to the first motor/generator and selectively connected to the input shaft, a planetary carrier directly connected to the input shaft, and a ring gear selectively connected to a front wheel output gear; and a connection unit disposed at a selective connection part.

11. The transmission system for the four wheel drive hybrid electric vehicle of claim 10, further comprising:

a front wheel reduction gear unit on a front wheel midshaft parallel with the input shaft to reduce and transmit rotating power transmitted from the front wheel output gear to a front wheel differential; and a rear wheel reduction gear unit reducing and transmitting rotating power transmitted from the rear wheel output gear of the second motor/generator to the rear wheel differential.

12. The transmission system for the four wheel drive hybrid electric vehicle of claim 11, wherein the planetary gear set is configured of a single pinion planetary gear set.

13. The transmission system for the four wheel drive hybrid electric vehicle of claim 11, wherein a torsion damper is between the output shaft and the input shaft of the engine.

14. The transmission system for the four wheel drive hybrid electric vehicle of claim 11, wherein the first motor/generator is a generation purpose and the second motor/generator is a driving purpose.

15. The transmission system for the four wheel drive hybrid electric vehicle of claim 11, wherein the front wheel reduction gear unit includes:

the front wheel midshaft parallel with the input shaft between the input shaft and the front wheel differential;

a front wheel first mid gear on the front wheel midshaft gear-meshed with the front wheel output gear; and a front wheel second mid gear on the front wheel midshaft gear-meshed with a front wheel final reduction gear of the front wheel differential.

16. The transmission system for the four wheel drive hybrid electric vehicle of claim 15, wherein the rear wheel reduction gear unit includes:

a rear wheel midshaft between the rear wheel output gear and the rear wheel differential; and a rear wheel mid gear on the rear wheel midshaft gear-meshed between the rear wheel output gear and the rear wheel final reduction gear of the rear wheel differential, respectively.

17. The transmission system for the four wheel drive hybrid electric vehicle of claim 11, wherein the connection unit includes:

a first clutch between the ring gear of the planetary gear set and the front wheel output gear;

a second clutch between the sun gear of the planetary gear set and the planetary carrier; and a brake between the input shaft and the front wheel transmission housing.

18. The transmission system for the four wheel drive hybrid electric vehicle of claim 17, wherein the connection unit:

releases all the operations of the first and second clutches and the brake in an EV mode;

operates only the second clutch in the starting of the engine and a continuous mode;

operates the first and second clutches in a parallel mode;

operates only the first clutch in a power split mode; and operates the first clutch and the brake in a regenerative braking mode.

19. A transmission system for a four wheel drive hybrid electric vehicle, comprising:

an input shaft selectively connected to a front wheel transmission housing while being connected an output shaft of an engine;

a first motor/generator having motor and generator functions and disposed in the front wheel transmission housing;

a second motor/generator having motor and generator functions and connected to a rear wheel output gear disposed in a rear wheel transmission housing;

a planetary gear set on the input shaft and including a sun gear directly connected to the first motor/generator and selectively connected to the input shaft, a planetary carrier directly connected to the input shaft, and a ring gear selectively connected to a front wheel output gear;

a first clutch between the ring gear of the planetary gear set and the front wheel output gear;

a second clutch between the sun gear of the planetary gear set and the planetary carrier;

a brake between the input shaft and the front wheel transmission housing;
a front wheel reduction gear unit on a front wheel midshaft parallel with the input shaft to reduce and transmit rotating power transmitted from the front wheel output gear to a front wheel differential; and
a rear wheel reduction gear unit reducing and transmitting rotating power transmitted from the rear wheel output gear of the second motor/generator to a rear wheel differential;
whereby a driving mode including an EV mode, starting of the engine, a continuous mode, a power split mode, a parallel mode, and a regenerative braking mode is implemented.

20. The transmission system for the four wheel drive hybrid electric vehicle of claim 19, wherein the front wheel reduction gear unit includes:
   the front wheel midshaft parallel with the input shaft between the input shaft and the front wheel differential;
   a front wheel first mid gear on the front wheel midshaft gear-meshed with the front wheel output gear; and
   a front wheel second mid gear on the front wheel midshaft gear-meshed with a front wheel final reduction gear of the front wheel differential.

21. The transmission system for the four wheel drive hybrid electric vehicle of claim 20, wherein the rear wheel reduction gear unit includes:
   a rear wheel midshaft between the rear wheel output gear and the rear wheel differential; and
   a rear wheel mid gear on the rear wheel midshaft gear-meshed between the rear wheel output gear and the rear wheel final reduction gear of the rear wheel differential, respectively.

22. The transmission system for the four wheel drive hybrid electric vehicle of claim 20, wherein the planetary gear set is configured of a single pinion planetary gear set.

23. The transmission system for the four wheel drive hybrid electric vehicle of claim 20, wherein:
   all the operations of the first and second clutches and the brake are released in the EV mode;
   only the second clutch is operated in the starting of the engine and the continuous mode;
   the first and second clutches are operated in the parallel mode;
   only the first clutch is operated in the power split mode; and
   the first clutch and the brake are operated in the regenerative braking mode.

24. The transmission system for the four wheel drive hybrid electric vehicle of claim 20, wherein a torsion damper is between the output shaft and the input shaft of the engine.

25. The transmission system for the four wheel drive hybrid electric vehicle of claim 20, wherein the first motor/generator is a generation purpose and the second motor/generator is a driving purpose.

26. A transmission system for a four wheel drive hybrid electric vehicle, comprising:
   an input shaft connected to an output shaft of an engine;
   a first motor/generator having motor and generator functions and disposed in a front wheel transmission housing;
   a second motor/generator having motor and generator functions and connected to a rear wheel output gear disposed in a rear wheel transmission housing;
   a planetary gear set on the input shaft and including a sun gear directly connected to the first motor/generator and selectively connected to the input shaft, a planetary carrier directly connected to the input shaft, and a ring gear selectively connected to a front wheel output gear;
   a first clutch between the ring gear of the planetary gear set and the front wheel output gear;
   a second clutch between the sun gear of the planetary gear set and the planetary carrier;
   a front wheel reduction gear unit on a front wheel midshaft parallel with the input shaft to reduce and transmit rotating power transmitted from the front wheel output gear to a front wheel differential; and
   a rear wheel reduction gear unit reducing and transmitting rotating power transmitted from the rear wheel output gear of the second motor/generator to a rear wheel differential;
   whereby a driving mode including an EV mode, starting of the engine, a continuous mode, a power split mode, a parallel mode, and a regenerative braking mode is implemented.

27. The transmission system for the four wheel drive hybrid electric vehicle of claim 26, wherein the front wheel reduction gear unit includes:
   the front wheel midshaft parallel with the input shaft between the input shaft and the front wheel differential;
   a front wheel first mid gear on the front wheel midshaft gear-meshed with the front wheel output gear; and
   a front wheel second mid gear on the front wheel midshaft gear-meshed with a front wheel final reduction gear of the front wheel differential.

28. The transmission system for the four wheel drive hybrid electric vehicle of claim 27, wherein the rear wheel reduction gear unit includes:
   a rear wheel midshaft between the rear wheel output gear and the rear wheel differential; and
   a rear wheel mid gear on the rear wheel midshaft gear-meshed between the rear wheel output gear and a rear wheel final reduction gear of the rear wheel differential, respectively.

29. The transmission system for the four wheel drive hybrid electric vehicle of claim 27, wherein the planetary gear set is configured of a single pinion planetary gear set.

30. The transmission system for the four wheel drive hybrid electric vehicle of claim 27, wherein:
   all the operations of the first and second clutches and the brake are released in the EV mode and the regenerative braking mode;
   only the second clutch is operated in the starting of the engine and the continuous mode;
   the first and second clutches are operated in the parallel mode; and
   only the first clutch is operated in the power split mode.

31. The transmission system for the four wheel drive hybrid electric vehicle of claim 27, wherein a torsion damper is between the output shaft and the input shaft of the engine.

32. The transmission system for the four wheel drive hybrid electric vehicle of claim 27, wherein the first motor/generator is a generation purpose and the second motor/generator is a driving purpose.

* * * * *